US007938601B2

(12) United States Patent
Metzner et al.

(10) Patent No.: US 7,938,601 B2
(45) **Date of Patent: *May 10, 2011**

(54) USE OF A DISTRIBUTOR OR DIFFUSER IN THE FORM OF A THIN-WALLED, AIR-PERMEABLE HEAT-REACTIVE LAYER FOR MACHINING A WORKPIECE

(75) Inventors: Thilo Metzner, Königsbrück (DE); Simon Metzner, Schmorkau (DE)

(73) Assignee: MB - Portatec GmbH (DE)

( * ) Notice: Subject to any disclaimer, the term of this patent is extended or adjusted under 35 U.S.C. 154(b) by 629 days.

This patent is subject to a terminal disclaimer.

(21) Appl. No.: 11/811,251

(22) Filed: Jun. 8, 2007

(65) Prior Publication Data

US 2009/0263203 A1 Oct. 22, 2009

Related U.S. Application Data

(62) Division of application No. 11/000,764, filed on Dec. 1, 2004, now Pat. No. 7,244,082.

(30) Foreign Application Priority Data

Dec. 1, 2003 (DE) ................................. 103 57 268

(51) Int. Cl.
*B23Q 3/00* (2006.01)

(52) U.S. Cl. ....................................... 409/132; 409/136

(58) Field of Classification Search .................. 409/131, 409/132, 135, 136; 408/1 R; 508/100–109; 269/21

See application file for complete search history.

(56) References Cited

U.S. PATENT DOCUMENTS

| | | | | |
|---|---|---|---|---|
| 3,074,392 | A * | 1/1963 | Fisher | 408/1 R |
| 3,749,625 | A * | 7/1973 | Berg | 156/250 |
| 3,882,461 | A * | 5/1975 | Vinnemann et al. | 382/312 |
| 4,005,635 | A * | 2/1977 | Feldcamp | 409/132 |
| 4,519,732 | A * | 5/1985 | Sutcliffe | 408/1 R |
| 4,781,495 | A * | 11/1988 | Hatch et al. | 408/1 R |
| 4,808,046 | A * | 2/1989 | Pilkington et al. | 409/132 |
| 4,946,320 | A * | 8/1990 | VanderMey | 409/132 |
| 6,703,586 | B1 * | 3/2004 | Kast | 219/203 |
| 2004/0265499 | A1 * | 12/2004 | Hashizume et al. | 427/437 |

FOREIGN PATENT DOCUMENTS

| | | |
|---|---|---|
| DE | 87 03 223.6 | 5/1987 |
| DE | 40 30 113 | 3/1992 |
| DE | 4030113 A1 * | 3/1992 |
| DE | 20117390 U1 * | 4/2002 |
| DE | 20117390 | 5/2002 |

* cited by examiner

*Primary Examiner* — Boyer D Ashley
*Assistant Examiner* — Sara Addisu
(74) *Attorney, Agent, or Firm* — Robert W. Becker; Robert W. Becker & Assoc.

(57) ABSTRACT

In the use of a distributor or diffuser in the form of a thin-walled, completely or partially air-permeable, heat-reactive layer for drilling or milling machining of a workpiece with a tool, a vacuum, surface tension is produced, which is large enough to fix the position of the workpiece, by using a vacuum over the layer acting as a distributor or a diffuser on the surface of the workpiece to be machined. The workpiece is then machined, and a cutting speed and rate of feed is adjusted, such that a defined local heating takes place in a contact area between the tool and workpiece. The peak temperature at the contact area is greater or the same as a melting temperature of the surface of the distributor or diffuser.

13 Claims, 2 Drawing Sheets

USE OF A DISTRIBUTOR OR DIFFUSER IN THE FORM OF A THIN-WALLED, AIR-PERMEABLE HEAT-REACTIVE LAYER FOR MACHINING A WORKPIECE

This application is a divisional application of co-pending U.S. patent application Ser. No. 11/000,764 allowed on Mar. 8, 2007. This specification for the instant application should be granted the priority date of Dec. 1, 2003, the filing date of the corresponding German patent application 103 57 268.6.

BACKGROUND OF THE INVENTION

The invention relates to a method and an assembly for machining thin sheets and thin-walled, single or two-fold curved, three-dimensionally shaped sheets, plates, or shells, in particular by material-removing machining methods, such as milling and drilling. The invention further relates to the use of a distributor or diffuser in the form of a thin-walled, completely or partially air-permeable, heat-reactive layer for drilling or milling machining of a workpiece.

With material-removing machining of thin-walled sheets, the machining forces and also the feed rate depend significantly on the possibilities of fixing the part during cutting by the connection to the remaining grid. This is true especially when making small parts, where often the typical vacuum tension is not applied across a suitably large surface in order to hold the part.

As is known, it was attempted to achieve a greater static friction caused by the vacuum by increasing the surface adhesion factor of exchangeable substratum made of paper or similar materials that are partly air-permeable. Adhesive sprays or similar means, however, are difficult to manipulate in a production-technical sense, since at the same time, all unwanted particles, such as shavings and the like, adhere to the contact surfaces, representing substantial risk for an acceptable vacuum tension.

Known substratum with a suction cup character, such as rubber, are cost-intensive and not well suited for small parts.

DE 201 17 390 U1 discloses a device for clamping plates to be machined with vacuum pressure. The device has a flat plate, which has through-holes leading from its upper side to its lower side. Between the upper side of the support plate and the lower side of a workpiece plate to be machined, a defined, air-permeable layer of filter paper is arranged. Via a vacuum pump, a partial vacuum can be produced, which acts on the workpiece via flow-through throttle means and via the defined, air-permeable layer. In this manner, it is possible to produce a sufficiently large vacuum pressure for clamping, independent of the respective contour of the plate to be machined on its lower side.

In a further development, the support plate is not dimensionally stable, rather is thin and flexible, in the manner of a film. When such a support plate is arranged with interposition of air-permeable filter material of defined thickness on the base plate, a defined upper side of the support plate is provided, which is suited completely for clamping of plates to be machined with interposition of the defined, air-permeable material.

It is disadvantageous to use two, thin-walled, film-like layers, which serve for the defined production of a vacuum. Thus, by means of sliding friction on the defining layers of these two films, local displacement, and therewith, position changes of the workpiece to be machined, can occur. In addition, the technological manufacturing preparation requires the mounting of two flexible films on the vacuum table.

A further disadvantage is that especially with heavy structured workpieces, for example skeletal or fishbone workpieces, and with machining with high cutting and feed rates, such as, for example, those with milling with end mills, a safe positional fixing of the workpiece on the vacuum table cannot be realized.

DE 40 30 113 C2 discloses a device for clamping plates to be machined, in which the base plate, on which the workpiece to be machined is accommodated, has a plurality of densely spaced through-bores with a diameter between 0.1 and 1.0 mm. A disadvantage of this assembly is the relatively high manufacturing costs for making the base plate.

In order to preclude contact between the main blade of the rotating cutting tool and the surface of the base place during machining, especially with milling, in a preferred further development an exchangeable abrasive material is placed on the upper side of the base plate. The filter paper that preferably is used effects a change of the volume flow upon application of a vacuum pressure on the base plate. The object of the filter paper is additionally to retain the cuttings falling during the machining of the plate before penetration into the bores of the base plate, in order to prevent damage to the vacuum pump.

DE 87 03 223 U1 discloses a vacuum clamping plate, in which on the surface of the clamping surface, an adhesive coating is located, which preferably comprises a perforated mat made of rubber or plastic, or alternatively, is sprayed onto the clamping surface. The reusable adhesive coating, therefore, should guarantee the absorption of the acting feed forces with roller or front milling. With the proposed use of an elastic adhesive coating, this object cannot be solved technically. Thus, with the use of an adhesive coating made of perforated rubber or perforated plastic, under the effect of the acting cutting and feed forces a torsion-like movement of the clamped workpiece results, which leads inevitably to position or form abnormalities.

SUMMARY OF THE INVENTION

The object of the invention is to eliminate the disadvantages of the prior art and to propose a method for the secure accommodation of clamped workpieces to be machined, especially of heavily structured, perforated parts on a vacuum table, as well as an assembly for performing the method.

With the method, a sufficiently large holding force for positional fixing is produced in a first step, using a vacuum over a layer acting as a distributor or diffuser on the surface of a workpiece to be machined.

The machining of the workpieces follows in a second step, whereby the cutting parameter, in particular the cutting speed and the feed rate, are adjusted such that a targeted localized heating in the contact area of the tool and workpiece takes place, whereby the temperature peak is greater or the same as the melting temperature of the surface of the distributor or diffuser. In addition to the chipping, the heating concerns especially the burr. By means of the temporary, local melting, a form-locking connection and an adhesion of the burr is effected on the surface of the distributor/diffuser.

After the complete machining of the workpiece, in a third step the vacuum tension is released and the workpiece is detached from the clamping device.

The assembly comprises a vacuum table with a base plate, which has a plurality of air venting channels or bores, which open on the upper side of the base plate. On the upper side of the base plate, a thin-walled, film-like layer is disposed, which is completely or partially air permeable.

Preferably, the approximately 0.1 mm to 1.0 mm thick homogeneous layer has perforations uniformly or stochastically arranged, which make possible the passage of air. Depending on the classes of workpieces to be machined and their contours, the perforations preferably are arranged in the form of a reticule or a matrix. In a further preferred form, the individual perforations have a meander-like structure or are formed as concentric circles.

Depending on the order quantity or number of pieces to be machined, in another preferred embodiment the arrangement of the perforations is adapted directly to the contour of the workpiece assortment to be machined. By means of the spatial arrangement of the individual elements of the perforations and their distance to one another, defined, constant tensions on the underside of the workpiece to be machined can be produced by the vacuum tensioning device. In order to make possible a secure tensioning also with larger cutting forces, in particular with contour milling at high feed and cutting rates, at least the surface of the layer facing the workpiece to be clamped is moistened with a plastic that melts with a little heating. In a preferred embodiment, the homogeneous layer comprises a thin-walled, polyethylene film with a plurality of symmetrically arranged perforations.

In an alternative embodiment, the layer comprises an environmentally friendly, air permeable substrate, such as paper flow or textile web, on whose surface an easily melting plastic is applied in a punctiform or linear manner.

In a further, likewise preferred embodiment, the upper and lower sides of the layer have a partial moistening or coating with an easily melting plastic. In this manner, this layer can be used twice, because after any damage of the surface facing the clamped workpiece by a machining tool, the intact underside of the layer still can be used for the subsequent operation.

With the machining of the workpiece, in particular with the machining of aluminum, a finer burr, which can hardly be seen with the naked eye, is formed. This burr penetrates through into the soft, flexible surface of the layer and clamps into it. In addition, it was observed that with machining with high cutting and feed rates, in spite of the good heat conductance, a temporary, local heating of the workpiece in the area of the cutting edge occurs. The frictional heat between the tool and workpiece leads locally and temporarily to a melting of the plastic on the surface of the layer in the area of the cutting edge, that is, on the entire outer contour of the workpiece, and as a result to a form-locking, thermoplastic clamping of the underside of the workpiece with the surface of the layer fixed into its position by the vacuum tensioning table.

DETAILED DESCRIPTION OF THE PREFERRED EMBODIMENTS

The approximately 0.1 mm to 1.0 mm thick layer that is used is relatively soft and has a central mechanical stability, in order to make possible a penetration of sharp edges, for example burrs. It is reusable and based on its preferably smooth surface, easy to clean. In addition, no unwanted particles (chip pieces) remain adhered on the layer.

The invention will be described in more detail with reference to two embodiments:

Embodiment 1

Figure 2:
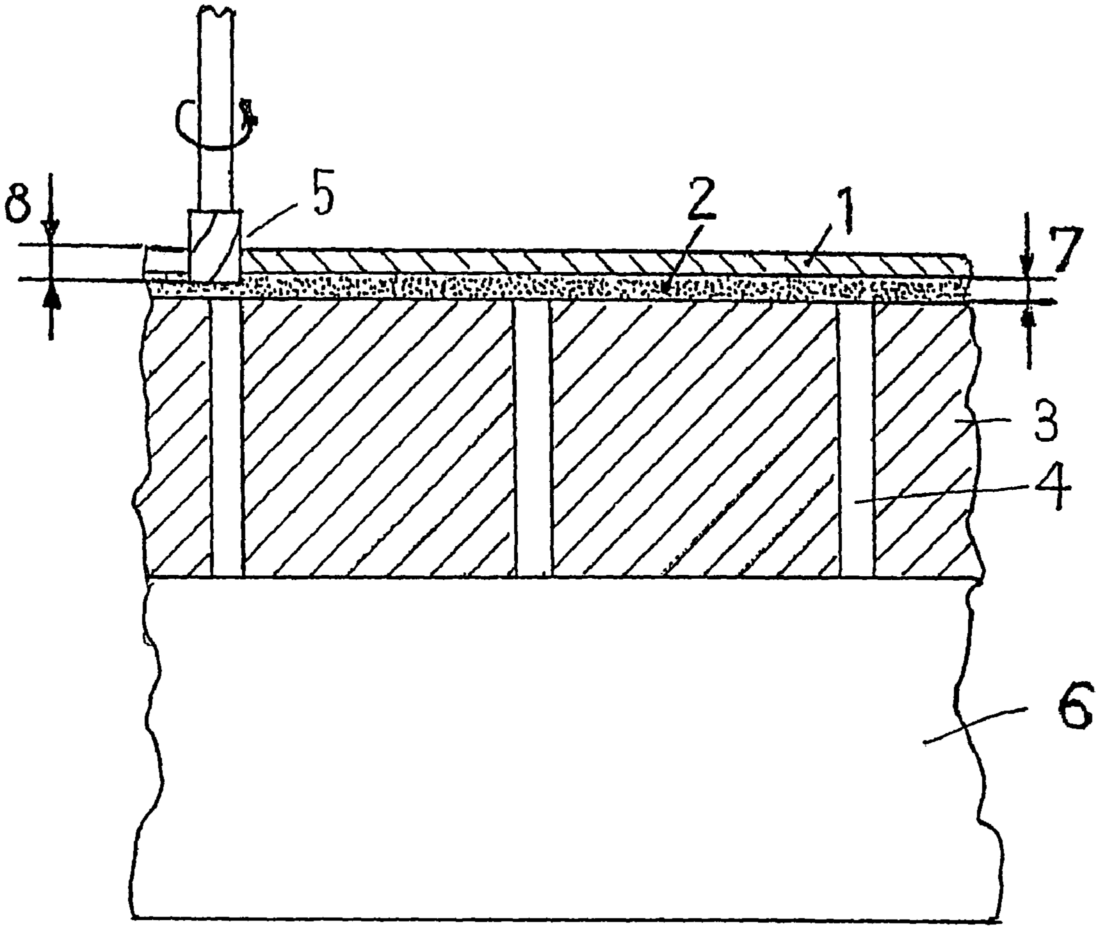
FIG. 2 shows the assembly for machining workpieces with a milling and drilling tool according to the present invention.

As shown in FIG. 2, for machining of a workpiece by a drilling/milling tool 5, the assembly comprises a vacuum table 3 with a base plate 6, which has a plurality of air venting channels or bores 4, which open on the upper side of the base plate 6. On the upper side of the base plate 6, a thin-walled, film-like layer 2 is disposed, which is completely or partially air permeable, and which acts a diffuser or distributor.

Figure 1:
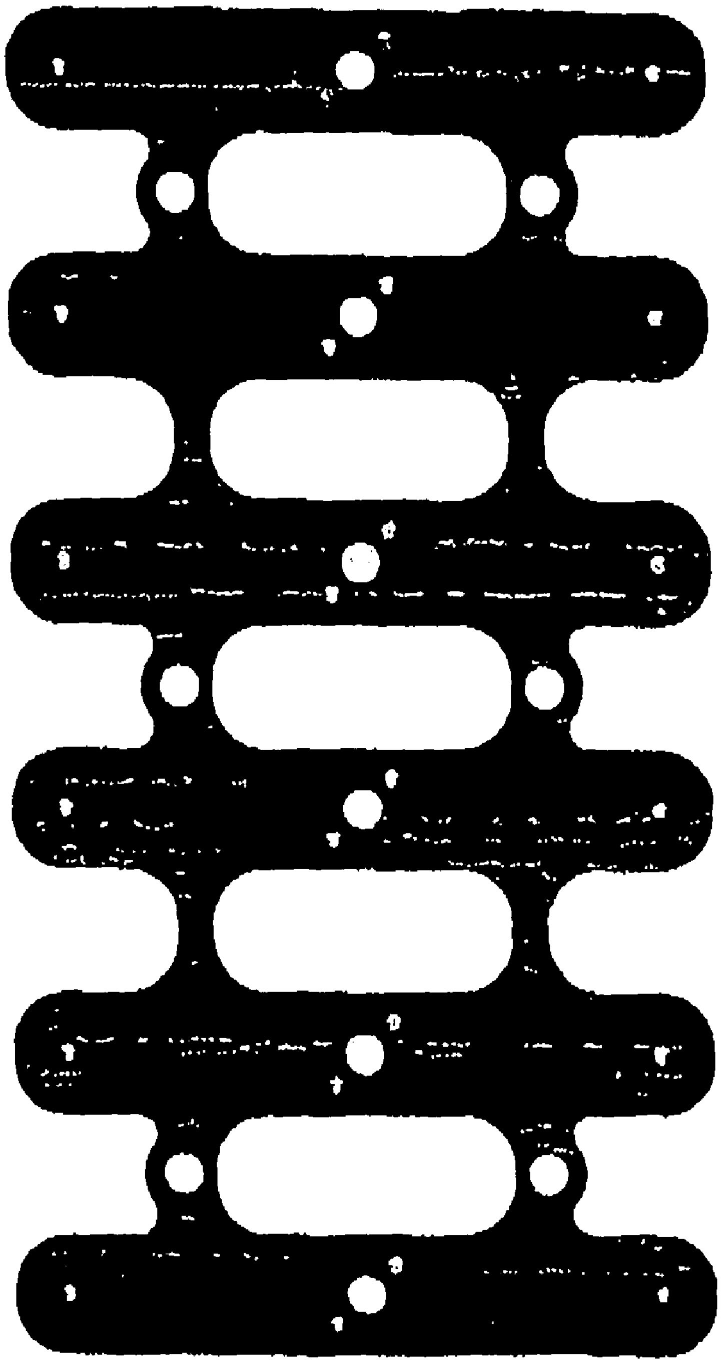
FIG. 1 shows a thin aluminum sheet for milling and drilling with an end mill.

For contour milling and drilling of an aluminum thin sheet (FIG. 1) with an end mill, a 0.2 mm thick polyethylene film with uniformly arranged perforations is placed on the vacuum table 3 of a portal milling assembly, as shown in FIG. 2. An aluminum sheet section is positioned thereon and next, the semifinished part is fixed into its position via the vacuum tensioning device. The cutting depth 7 is slightly greater than the sheet thickness 8 of the semifinished part to be machined. The rotational speed n or the cutting speed $v_s$ and tooth advancement $s_z$ or advancement s are selected such that based on the frictional heating between the primary blade of the end mill and the workpiece 1, a local heating of >=120° occurs. By means of the discharge of the frictional heating in the direction of the vacuum table 3, a softening of the polyethylene film near the surface area takes place and results in an adhesion and form-locking clamping of the burr formed during end milling on the underside of the aluminum sheet. By means of this connection, an axial displacement of the aluminum sheet on the thin-walled polyethylene layer 2 acting as the distributor or diffuser is effectively prevented, as is any torsional movement.

Embodiment 2

For mill machining of a fishbone-type aluminum thin sheet by means of a form cutter, a thin-walled, air permeable mat layer is placed on the vacuum tensioning device of a cross sliding table-milling machine, the mat layer having a plurality of heat-reactive plastic burls on the upper side facing the semifinished part to be machined. The layer thickness of the paper mat is approximately 0.1 mm.

For machining a greater number of pieces or larger job order, the arrangement of the plastic burls on the profile is adapted to the contour of the workpiece to be machined. In this manner, first, the amount of the plastic to be applied on the mat can be limited from an environmental view. Second, the arrangement of the plastic burls can be used for the easier positioning and alignment of the workpiece to be machined on the vacuum table. In this connection, preferably colored plastic burls are applied.

The specification incorporates by reference the disclosure of German priority document 103 57 268.6 filed Dec. 1, 2003.

The present invention is, of course, in no way restricted to the specific disclosure of the specification and drawings, but also encompasses any modifications within the scope of the appended claims.

The invention claimed is:

1. The use of a distributor or diffuser in the form of a thin-walled, completely or partially air-permeable, heat-reactive layer for drilling or milling machining of a workpiece with a tool, comprising:

producing a vacuum surface tension for fixing a position of the workpiece using a vacuum over the layer acting as a distributor or a diffuser on a surface of the workpiece to be machined;

machining the workpiece, wherein a cutting speed and/or rate of feed is adjusted, such that a defined local heating takes place in a contact area between the tool and workpiece, whereby a temperature peak at the contact area is greater or the same as a melting temperature of the surface of the distributor or diffuser; and releasing the vacuum surface tension and detaching the workpiece after completed machining of the workpiece.

2. The use of a distributor or diffuser according to claim 1, wherein the workpiece is a non-magnetic thin or heavy plate.

3. The use of a distributor or diffuser according to claim 1, wherein the workpiece is detached by means of an air cushion.

4. The use of a distributor or diffuser according to claim 1, further comprising providing an assembly for using the distributor or diffuser, the assembly comprising a vacuum table with a base plate, wherein the base plate has a plurality of air venting channels or bores opening on the upper side of the base plate, wherein on an upper side of the base plate, the distributor or diffuser is disposed.

5. The use of a distributor or diffuser according to claim 1, wherein the layer has perforations, which make possible air passage.

6. The use of a distributor or diffuser according to claim 5, wherein the perforations are arranged in the form of a reticule or a matrix.

7. The use of a distributor or diffuser according to claim 5, wherein the perforations have a meander-shaped structure or are formed as concentric circles.

8. The use of a distributor or diffuser according to claim 5, wherein the perforations are arranged in a stochastic manner.

9. The use of a distributor or diffuser according to claim 5, wherein the number, arrangement, and sizes of the perforations are adapted to a contour or projected surface of the workpiece to be processed.

10. The use of a distributor or diffuser according to claim 1, wherein the layer comprises a perforated polyethylene film.

11. The use of a distributor or diffuser according to claim 1, wherein the layer comprises an environmentally-friendly, organic substrate, wherein an air-permeable, easily meltable plastic is applied on at least one side of the substrate.

12. The use of a distributor or diffuser according to claim 11, wherein the substrate comprises a paper fleece or textile web, wherein an easily meltable plastic is applied linearly or in a punctiform manner on a surface of the paper fleece or textile web.

13. The use of a distributor or diffuser according to claim 11, wherein on or in the substrate, a colored plastic is applied linearly or in a punctiform manner.

* * * * *